Figures 1, 2, 3:
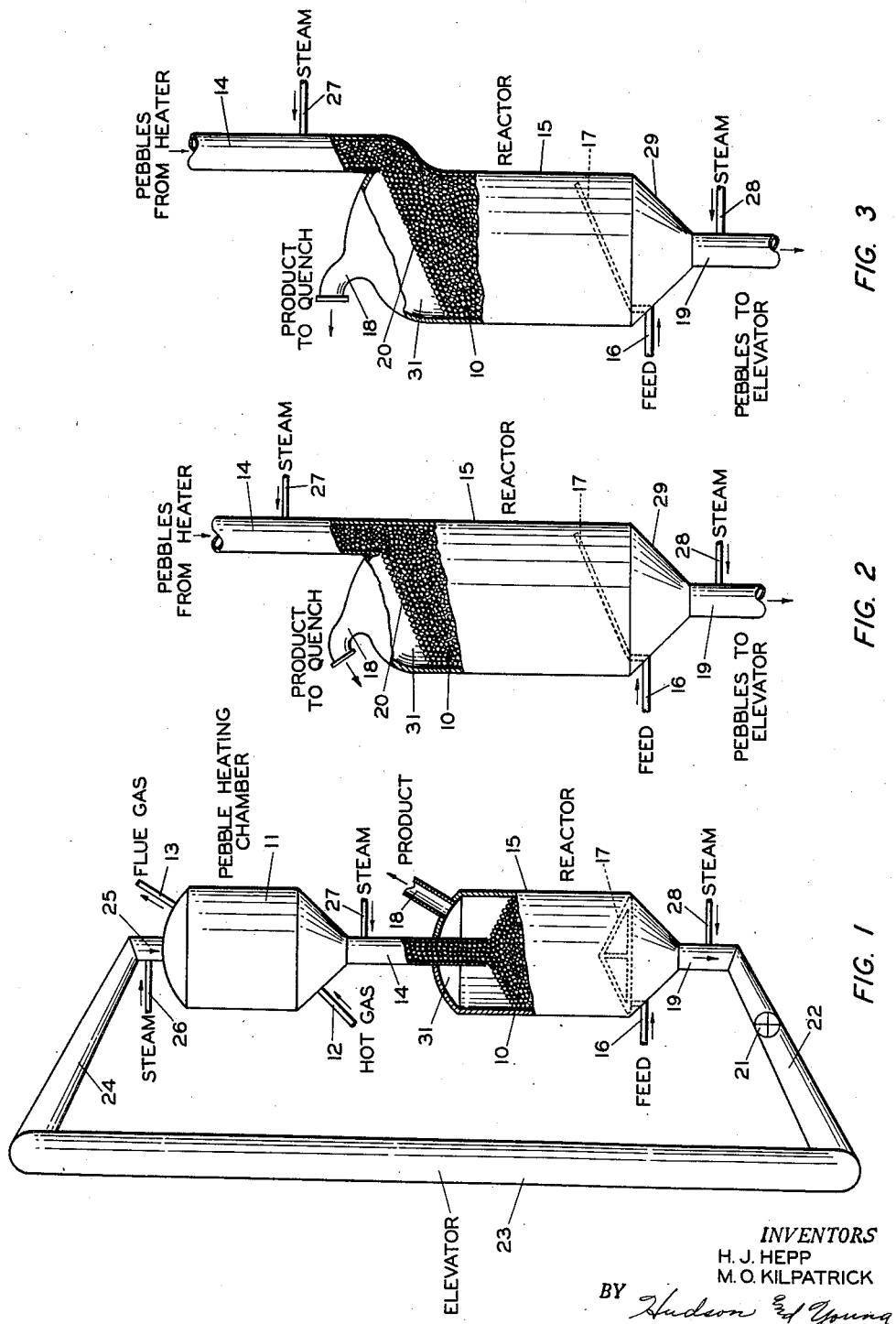

INVENTORS
H. J. HEPP
M. O. KILPATRICK
BY Hudson & Young
ATTORNEYS

Patented July 10, 1951

2,559,957

UNITED STATES PATENT OFFICE 2,559,957

PEBBLE HEATER

Harold J. Hepp and Myron O. Kilpatrick, Bartlesville, Okla., assignors to Phillips Petroleum Company, a corporation of Delaware Application September 27, 1946, Serial No. 699,666

5 Claims. (Cl. 196—55)

This invention relates to an improved process and apparatus for effecting thermal reactions in vapor phase by contacting the vapors with hot refractory pebbles. A specific embodiment of the invention pertains to a method and apparatus for introducing hot pebbles to the reaction zone of a pebble heater. Another embodiment is concerned with a method of withdrawing product gas from the reaction zone.

The method and apparatus herein disclosed have application to practically all pebble heater processes but are particularly adapted to processes for the conversion of hydrocarbon oils such as thermal cracking, dehydrogenation, aromatization, reforming, and the like. The invention exhibits its greatest utility in high temperature thermal cracking of hydrocarbons in the range of about 1400°–3000° F.

As yet no entirely satisfactory pebble heater process for cracking hydrocarbons has been devised. In order to understand some of the difficulties of the prior art and the contributions of this invention thereto, reference is made to the drawing of which Figure 1 is an elevational view, partly in section, of a conventional pebble heater apparatus. Figures 2 and 3 are elevational views, partly in section, of two preferred designs of pebble heater reactors according to the invention.

Using Figure 1 to illustrate conventional pebble heater practice, a contiguous mass of refractory pebbles descends through pebble heater 11 and is therein contacted with a countercurrent stream of hot gas, usually combustion gas, admitted through line 12 and exhausted through line 13. The mass of pebbles 10 which has been heated to a temperature above the desired reaction temperature passes through neck 14 extending into reactor 15 forming a bed of pebbles within the reactor having a natural angle of repose between the outlet of the neck and the sides of the reactor providing vapor space 31 above the bed. Simultaneously with the descent of hot pebbles through reactor 15 a desirable hydrocarbon feed is introduced to the reactor through line 16 and distributing means 17. The feed is quickly raised to reaction temperature by contact with hot pebbles 10 and desirable conversion is effected before the effluents are taken off through lines 18. Feed distributing means 17 is constructed to provide uniform distribution of feed gases without unduly obstructing the flow of pebbles. Effluents in line 18 are taken through a quenching step and/or product separation step as desired. As the mass of pebbles descends through reactor 15 it is cooled to below reaction temperature and must be reheated before further utilization. Pebbles pass out through outlet 19, feeder valve 21, and chute 22 into elevator 23 which lifts them to a point above pebble heating chamber 11 and drops them into chute 24 from which they flow through inlet 25 into heating chamber 11.

It is desirable to maintain relatively equal gas pressures in chambers 11 and 15 to prevent flow of gases from one chamber to the other. In some cases it is desirable to admit steam through lines 26, 27, and 28 to prevent escape of gases from those chambers through pebble lines.

The term pebble as referred to throughout the specification is defined as any particulate refractory contact material which is readily flowable through a contact chamber. Pebbles are preferably spherical and from about ⅛ inch to 1 inch in size but spheres ranging in size from about ¼ inch to ½ inch are the most practical. Uniform shapes and sizes are preferred but pebbles of irregular shape and size may be used. Pebbles may be made of ceramic material, such as alumina, or of metals and alloys, such as iron, nickel, Monel and inconel.

Using thermal cracking as an illustration temperatures of 1500 to 2500° F. are maintained in chamber 15. In this conventional system just described a throat connecting the two chambers is axially located and projects into the reaction chamber thereby forming a pebble-free vapor space at the top of the vessel. With this design a great deal of trouble has been encountered on account of the formation of carbon on the throat and other areas in this region since it is almost impossible to avoid some "dead" spaces or regions where the gas flow is relatively low. In addition, the high temperature of the throat itself compared to that of the gases aggravates the carbon-forming tendency since the throat is in contact with the partially cracked gases.

In the present invention the two difficulties just described are avoided by placing the throat in an unsymmetrical position at the side of the chamber as shown in Figures 2 and 3. The design of the invention provides a smooth streamlined gas exit which is free of obstruction and "dead" spaces, thus greatly reducing the tendency to form carbon. Moreover, the gases do not come in contact with a super heated throat. This design also provides for a substantially equal transit time for all portions of the gas leaving different parts of the pebble bed in its passage to the quench zone.

It is an object of the present invention to provide an improved pebble heater reactor design. It is also an object of the present invention to provide a pebble heater reactor which effects more uniform conversion of hydrocarbon without concomitant deposition of carbon on the pebble throat. Another object of the invention is to provide a pebble heater reactor design which effects uniform withdrawal of reaction products from the pebble heater bed. A further object of the invention is to provide a process for effecting improved hydrocarbon conversions in a pebble heater. Other objects of the invention will become apparent from the accompanying disclosure.

Referring more in detail to the design of Figure 2, reactor 15 has a pebble inlet or neck 14, positioned tangentially internally to the reactor (the cross section of both heater and throat being circular). Conical bottom 29 serves as a hopper for feeding pebbles into pebble outlet 19. Feed line 16 entering the lower part of reactor 15 is in communication with feed distribution means 17. The top closure wall of reactor 15 converges gradually and smoothly into product outlet 18. This feature provides for relatively equal transit time for gases between all parts of the top surface of the pebble bed and the duct leading to the quenching means. The pebbles in bed 10 form a sloping top surface 20 due to the natural angle of repose of the pebbles. This provides an unsymmetrical vapor space 31 and to overcome this, outlet 18 is eccentric to the cross section of reactor 15. In order to provide for equal transit time of gases through the pebble bed 10, gas distributing means 17 is positioned parallel to pebble bed surface 20. Lines 27 and 28 admit steam to prevent the escape of feed and reaction products from reactor 15 thru either pebble passageway.

Figure 3 shows a slight modification of the reactor shown in Figure 2, the essential difference being the location of neck 14. Neck 14 is tangent externally to reactor 15 and is in communication therewith thru the cylindrical wall thereof. Gas outlet 18 provides for horizontal take-off as compared to the oblique take-off in Figure 2.

Numerous modifications of the invention are feasible. While a reactor with a circular cross section is most desirable, other regular shapes such as square, octagonal, hexagonal, and so forth may be used. The advantages of the invention accrue from placing pebble inlet or neck 14 in other positions near the periphery of the reactor. Instead of a single product outlet a multiple-point exit header may be utilized with the individual outlets so positioned that each takes off a proportionate share of the gas.

In the operation of a reactor, such as that shown in Figures 2 and 3, in a pebble heater installation, a mass of pebbles heated to well above the reaction temperature desired in reactor 15 descends through neck 14, forms a pebble bed 10, filling the reactor up to a level 20. As the hot pebbles slowly descend through the reactor and pass out through pebble exit 19, they are contacted with a desirable feed introduced through line 16 and distribution means 17. The ascending feed is quickly brought to reaction temperature and is converted to desirable products according to a predetermined set of conditions. The reaction products converge in vapor space 31 passing into outlet 18 from which they are conducted to a rapid quench. Pebbles descending through outlet 19 are considerably cooler than those introduced through neck 18 and are conducted by an elevator to a point above the pebble heating unit for reheating and again passing through the reactor.

In hydrocarbon conversion reactions at elevated temperatures in which carbon is normally deposited on the pebble throat of a conventional pebble heater reactor, carbon deposition is substantially eliminated in the design of the invention. Moreover, the uniform and rapid withdrawal of reaction products from the top of the pebble bed effected by the design of the invention materially increases the yield of desirable products.

Various modifications of the invention not described will become apparent to those skilled in the art. The illustrative details disclosed are not to be construed as imposing unnecessary limitations on the invention.

We claim:

1. A conversion chamber for reacting gases at elevated temperatures by direct contact with a gravitating mass of pebbles and rapidly withdrawing reaction products before further appreciable reaction occurs, which comprises an upright, cylindrical vessel having an oblique, convex, curvilinear top closure member generally conforming to the natural slope of a freely flowing bed of pebbles introduced through an inlet at the juncture of said member with the cylindrical side of said vessel at the highest point thereof; an open pebble inlet in said vessel at said point; a gas outlet conduit in said closure member disposed so that a normal drawn from the midpoint of the top surface of said bed of pebbles passes therethrough said outlet conduit gradually diverging into the contour of said closure member so as to streamline gas flow out of said chamber; a bottom closure member for said vessel having an open pebble outlet therein encompassing the axis of said vessel; and gas inlet means extending completely across the lower portion of said vessel so as to distribute gas uniformly over the entire cross section thereof.

2. Apparatus of claim 1 in which the conduit means for introducing pebbles to said cylindrical-walled vessel is externally tangent thereto.

3. Apparatus of claim 1 in which the conduit means for introducing pebbles to said cylindrical-walled vessel is internally tangent thereto.

4. In a process for conversion of hydrocarbon involving cracking wherein hydrocarbon vapor is passed upwardly through a confined upright vertically extending zone in intimate contact with a gravitating bed of hot, refractory, pebbles introduced into the upper portion of said zone and flowing out the bottom thereof, thereby heating and at least partially cracking said hydrocarbon, and an effluent hydrocarbon stream subject to degradation reactions with concomitant carbon deposition is removed from the upper portion of said zone, the improvement which comprises continuously introducing said pebbles to said zone through an inlet at the juncture of its upper and lateral boundaries, thereby forming and maintaining a top surface on said pebble bed conforming to the natural slope thereof and oblique to the axis of said zone, and continuously funneling the cracked effluent through a zone of gradually and uniformly decreasing volume in the direction of flow to a vapor outlet opposite the center of the top surface of said pebble bed so as to decrease the average residence time of said effluent in the upper portion of said zone and reduce the formation of carbon therein.

5. A process for the conversion of hydrocarbon comprising passing a suitable hydrocarbon in vapor phase upwardly through a gravitating bed of hot, refractory pebbles in direct contact therewith in an upright cylindrical zone under reaction conditions so as to convert said hydrocarbon to more desirable hydrocarbon subject to degradation reactions with concomitant carbon deposition at conversion temperature; continuously introducing a contiguous stream of hot refractory pebbles to said zone at the confluence of the cylindrical side with the top thereof so as to form and maintain a pebble bed having an oblique top surface extending from the point of pebble introduction along the natural repose of said pebble bed to the opposite side of said zone; withdrawing reaction effluent from the top surface of said pebble bed through a vapor space gradually and uniformly decreasing in volume in the direction of vapor flow to an outlet opposite the center of the top surface of said pebble bed so as to streamline and funnel the flow of effluent from the zone, the point of pebble introduction and the funneling of effluent from said zone cooperating to reduce stagnant gas space in the upper end of said zone and concomitant carbon deposition therein.

HAROLD J. HEPP.
MYRON O. KILPATRICK.

REFERENCES CITED

The following references are of record in the file of this patent:

UNITED STATES PATENTS

| Number | Name | Date |
|---|---|---|
| 1,146,363 | Statham | July 13, 1915 |
| 1,450,327 | Meischke-Smith | Apr. 3, 1923 |
| 2,159,140 | Eckell | May 23, 1939 |
| 2,389,636 | Ramseyer | Nov. 27, 1945 |
| 2,393,636 | Johnson | Jan. 29, 1946 |
| 2,412,152 | Huff | Dec. 3, 1946 |
| 2,418,837 | Houdry | Apr. 15, 1947 |
| 2,429,359 | Kassel | Oct. 31, 1947 |
| 2,443,337 | Weber | June 15, 1948 |